(12) United States Patent
Lechner et al.

(10) Patent No.: US 8,056,939 B2
(45) Date of Patent: Nov. 15, 2011

(54) PLUG CONNECTOR FOR PIPING

(75) Inventors: Martin Lechner, Lindlar (DE); Norbert Terlau, Kürten (DE)

(73) Assignee: VOSS Automotive GmbH, Wipperfurth (DE)

( * ) Notice: Subject to any disclaimer, the term of this patent is extended or adjusted under 35 U.S.C. 154(b) by 148 days.

(21) Appl. No.: 12/297,842

(22) PCT Filed: Nov. 2, 2006

(86) PCT No.: PCT/EP2006/068042
§ 371 (c)(1),
(2), (4) Date: Oct. 20, 2008

(87) PCT Pub. No.: WO2007/121794
PCT Pub. Date: Nov. 1, 2007

(65) Prior Publication Data
US 2009/0167017 A1    Jul. 2, 2009

(30) Foreign Application Priority Data
Apr. 18, 2006  (DE) .................. 20 2006 006 301 U

(51) Int. Cl.
*F16L 37/00* (2006.01)
(52) U.S. Cl. .................. 285/323; 285/307; 285/243
(58) Field of Classification Search .................. 285/323, 285/307, 343, 243, 382
See application file for complete search history.

(56) References Cited

U.S. PATENT DOCUMENTS

| | | | | |
|---|---|---|---|---|
| 4,188,051 A | * | 2/1980 | Burge | 285/323 |
| 4,575,274 A | * | 3/1986 | Hayward | 285/323 |
| 4,613,158 A | * | 9/1986 | Ekman | 285/323 |
| 4,627,644 A | * | 12/1986 | Ekman | 285/323 |
| 4,871,196 A | * | 10/1989 | Kingsford | 285/323 |
| 5,090,741 A | * | 2/1992 | Yokomatsu et al. | 285/323 |
| 5,150,924 A | * | 9/1992 | Yokomatsu et al. | 285/323 |
| 5,230,539 A | | 7/1993 | Olson | |
| 5,511,830 A | * | 4/1996 | Olson et al. | 285/323 |
| 6,142,538 A | * | 11/2000 | Volgstadt et al. | 285/323 |
| 6,254,144 B1 | * | 7/2001 | Hagan | 285/323 |
| 6,554,323 B1 | * | 4/2003 | Salomon-Bahls et al. | 285/323 |
| 6,851,728 B2 | * | 2/2005 | Minami | 285/323 |
| 7,380,838 B2 | * | 6/2008 | Paluncic | 285/323 |
| 7,475,913 B2 | * | 1/2009 | Muto | 285/307 |
| 7,654,584 B2 | * | 2/2010 | Blivet et al. | 285/323 |
| 2007/0284875 A1 | | 12/2007 | Salomon-Bahls et al. | |

FOREIGN PATENT DOCUMENTS

| | | |
|---|---|---|
| DE | 28 37 977 A1 | 3/1980 |
| DE | 298 07 763 U1 | 9/1999 |
| DE | 200 07 703 U1 | 7/2000 |
| DE | 44 23 805 B4 | 12/2004 |
| DE | 203 19 959 U1 | 6/2005 |
| EP | 555981 A1 * | 8/1993 |
| EP | 0 132 319 A1 | 1/1995 |
| EP | 0 733 844 B1 | 10/1999 |

(Continued)

*Primary Examiner* — David E Bochna

(74) *Attorney, Agent, or Firm* — Brinks Hofer Gilson & Lione

(57) ABSTRACT

A plug connector for pipelines, in particular pipelines made of plastic, having a housing part comprising, in two-part form, a receiving part for a retaining element and fluid seal; and a coupling part for coupling the housing part to an assembly, and can be sealed with respect to the assembly, characterized in that the housing part is divided in such a way that the receiving part can be sealed directly with respect to the assembly.

3 Claims, 6 Drawing Sheets

FOREIGN PATENT DOCUMENTS

| | | |
|---|---|---|
| EP | 0 753 698 B1 | 8/2000 |
| EP | 1 199 506 A1 | 4/2002 |
| GB | 2 171 770 A | 9/1986 |
| WO | WO 03/031862 A | 4/2003 |

* cited by examiner ic # PLUG CONNECTOR FOR PIPING

CROSS REFERENCE TO RELATED APPLICATIONS

This application claims priority to German patent application number DE 20 2006 006 301.3, filed Apr. 18, 2006, and PCT/EP2006/068042, filed Nov. 2, 2006.

FIELD OF THE INVENTION

The present invention relates to a plug connector for pipelines, in particular pipelines made of plastic.

BACKGROUND OF THE INVENTION

The relevant prior art in relation to such plug connectors is provided, for example, by EP 0 753 698 B1, EP 0 733 844 B1 and DE 203 19 959 U1 (US 2007/0284875 A1) which describe various applications and structural designs of known coupling devices.

In this respect, EP 0 733 844 B1 describes a coupling device for the rapid and releasable coupling of at least one plastic pipeline, comprising a housing part with at least one receiving opening for inserting the pipeline, and also a clamping ring which is arranged in the receiving opening and which, in order to lock the pipeline, interacts via an outer cone with an inner cone of the housing part, wherein, for the purpose of being able to release the pipeline, the housing part comprises, in two-part form, a base part and an insert part which is connected releasably to said base part and which incorporates the inner cone, and the insert part is connected to the base part via a snap-action form-fitting connection. Provision is made for the insert part to have an inner, encircling sealing lip so that it can bear sealingly against the outer peripheral surface of the pipeline, wherein the sealing lip extends obliquely inward in the direction of insertion prior to the insertion of the pipeline in such a way that it is somewhat elastically widened by the inserted pipeline and then bears sealingly.

EP 0 753 698 B1 describes a plug connection for coupling pressure-medium lines, comprising a housing part with a socket having a one-side opening for the insertion of a plug section formed in particular by a pipeline end, wherein at least one retaining element is arranged within the socket on the side facing the opening and at least one sealing element is arranged, starting from the retaining element, in the direction away from the opening, and, during the operation of inserting the plug section into the socket of the housing part, a retaining function is ensured first of all, and, in the further course of the insertion operation, sealing of the plug section with respect to the housing part is additionally ensured via the sealing element, wherein the housing part comprises a leakage path in such a way that, when the plug section is in an inserted position in which it is locked by the retaining element but not yet sealed via the sealing element, a perceptible leakage within defined limits is ensured. Provision is made for the leakage path to be assigned a valve element in such a way that, with the plug section in the inserted position in which it is not yet sealed via the sealing element, it is possible on the one hand for the pressure medium to pass outwardly via the leakage path but, on the other hand, dirt particles and the like are prevented from penetrating from outside into the interior of the housing.

DE 203 19 959 U1 (US 2007/0284875 A1) describes a plug connector for fluid lines, comprising a housing part with a plug socket for the fluidtight insertion of a tubular plug-in part, wherein a retaining element for locking the inserted plug-in part and a fluid seal for sealing said part are arranged in the plug socket, and wherein the housing part comprises, in two-part form, a base part and an insert part which is connected thereto via a snap-action form-fitting connection. Provision is made for the base part in turn to comprise, likewise in two-part form, a receiving part for the retaining element, the fluid seal and the insert part and also a coupling part for coupling the housing part to a fluid line.

At the same time, DE 203 19 959 U1 (US 2007/0284875 A1) also claims a plug connector for fluid lines that can have the above features, comprising a housing part with a plug socket for the fluidtight insertion of a tubular plug-in part, wherein, starting from a dirt seal on the mouth side as viewed in the direction of insertion, first a retaining element for locking the inserted plug-in part and subsequently a fluid seal are arranged within the plug socket, wherein a leakage path is formed in such a way that, with the plug-in part in a prelocking position in which it is locked by the retaining element but is not yet sealed via the fluid seal, a physically perceptible leakage within defined limits is ensured. Provision is made for the leakage path to be formed by depressions which are arranged on the outer periphery of the plug-in part and which, in the prelocking position, are arranged on the one hand in the region of the fluid seal and on the other hand in the region of the dirt seal.

In the case of one-part couplers (EP 0 753 698 B1, EP 0 733 844 B1), it is conventional for receiving parts together with retaining element and sealing ring to be inserted into a metal screw-in stub. The disadvantage with these plug connections is that the content of metal is very high and therefore the costs for material and machining are also correspondingly high.

Consequently, use has also been made of two-part designs having reduced metal content. In the case of these two-part plug connections, it is conventional for preassembled plastic receiving parts together with retaining element and sealing ring to be fastened to screw-in parts, as can be found in DE 203 19 959 U1 (US 2007/0284875 A1) in particular in the embodiment illustrated in FIG. 6 thereof. These known plug connections follow the basic principle of "retention before sealing". The disadvantage of these plug connectors is that, apart from the main sealing ring which seals the pipe with respect to the receiving part, a further sealing ring has to seal the receiving part with respect to the screw-in part. This entails high costs on the one hand and on the other hand creates a point at which leakages can occur.

SUMMARY OF THE INVENTION

An object of the present invention is to provide a multipart plug connector of the type described above, which has the advantage of simplified sealing.

According to the invention, this is achieved for a plug connector by dividing the housing part in such a way that the receiving part can be sealed directly with respect to an assembly.

By virtue of the fact that the housing part is divided in such a way that the seal—arranged in any case on the outer connecting section of the screw in stub of the coupling part for thread sealing—also seals the interface between the parts of the housing part, a situation is advantageously achieved in which, apart from the main sealing ring formed by the fluid seal in the plug socket for the pipe, no further sealing ring has to seal the receiving part with respect to the screw-in coupling part. Here, various technical embodiments are possible for the plug connector according to the invention, the common feature of all the embodiments being that the fluid seal, in particular a sealing ring, on the pipe coupling side is the only interface to the pressurized space within the plug connection.

Further advantageous features of the invention are contained in the description which follows.

BRIEF DESCRIPTION OF THE DRAWINGS

The drawings show exemplary embodiments of the present invention which are described in more detail below. The drawings show.

DETAILED DESCRIPTION

In the various Figures, identical parts are always provided with the same reference signs and will therefore generally each only be described once in the text which follows.

Figure 1:
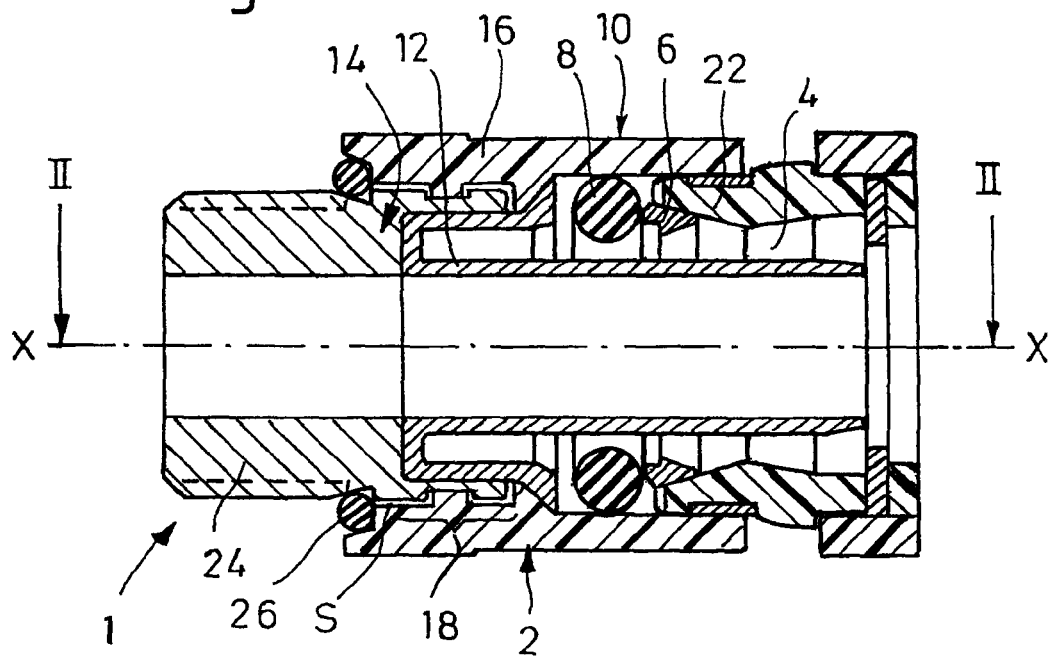
FIG. 1 shows a longitudinal section through a first embodiment of a plug connector according to the invention.
Figure 2:
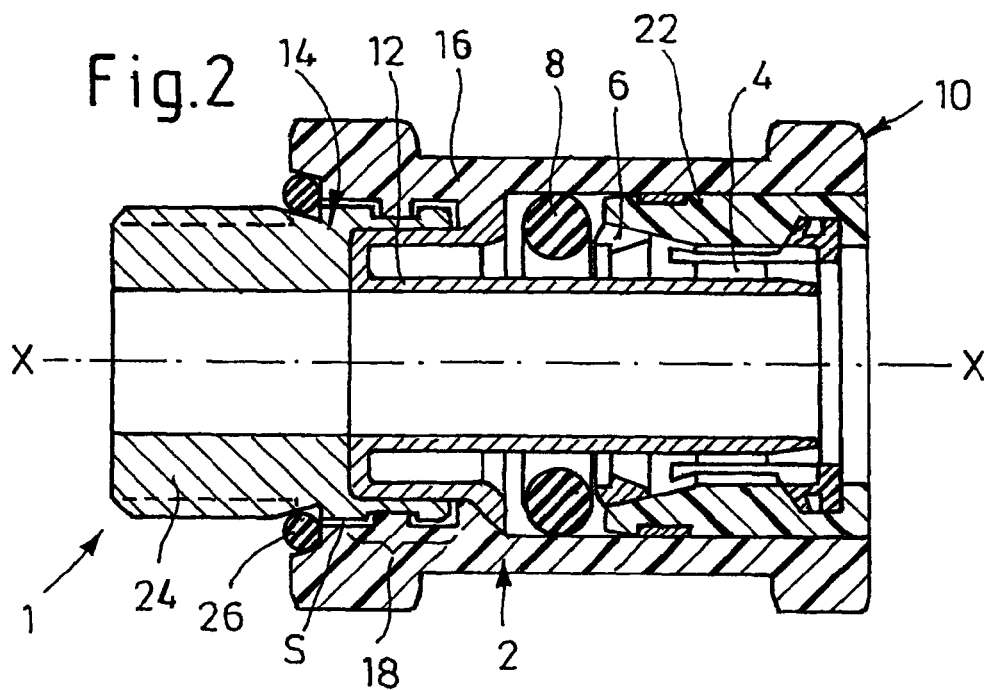
FIG. 2 shows a further longitudinal section through the plug connector according to the invention illustrated in FIG. 1, along the line II-II in FIG. 1.

As is evident first of all from FIGS. 1 and 2, a plug connector 1 according to the invention for pipelines, in particular pipelines made of plastic, comprises a housing part 2 with a plug socket 4 for the fluidtight insertion of a tubular plug-in part (not shown), in particular a plug-in part made of plastic, such as, for example, polyamide, wherein a retaining element 6 for locking the inserted plug-in part and a fluid seal 8 for sealing said part are arranged in the plug socket 4. The housing part 2 here comprises a base part 10 which is formed in two parts from a coupling part 14 and a receiving part 16 having a retaining element 6 and a fluid seal 8. The coupling part 14 is made of metal, for example brass, and preferably comprises a screw-in stub 24 with an external thread for coupling the housing part 2 to a threaded bore of any desired assembly (not shown). Within the housing part 2 is preferably additionally arranged a supporting sleeve 12 for engaging the plug-in part in a radially supporting manner.

In order to seal the threaded connection with the threaded bore, the screw-in stub 24 of the coupling part 14 has a seal 26, in particular an O ring.

Provision is made according to the invention for the base part 10 of the housing part 2 to be divided into the coupling part 14 and the receiving part 16 in such a way that the seal 26 which encloses the screw-in stub 24 of the coupling part 14 also seals the gap between the parts 14 and 16 of the housing part 2 at the same time. An additional seal inside the housing part 2 is therefore not required.

FIGS. 1 and 2 further show that the receiving part 16 is designed as a sleeve-shaped "cuff part" which, in the embodiment illustrated, can be clipped, securely against relative rotation, onto the coupling part 14 (designed without a hexagonal outer contour). The receiving part 16 is preferably made of plastic. The receiving part 16 y forms substantially the entire housing part 2 or base part 10 and also has an outer hexagonal contour for a screwing-in tool. The coupling part 14 is clipped into the cuff part of receiving part 16 from the direction of the screwing-in side (side of the screw-in stub 24) and has at least one surface which can transmit a torque for screwing in.

The fluid seal 8, preferably an O ring, for sealing the plug-in part (not shown) inserted into the plug socket 4, is arranged radially between the cuff part 16 and the tubular plug-in part. A latching region 18 of the cuff part 16, is preferably made from a plastic material that is radially elastic in such a way that no damage is caused during the clipping-on operation.

Figure 3:
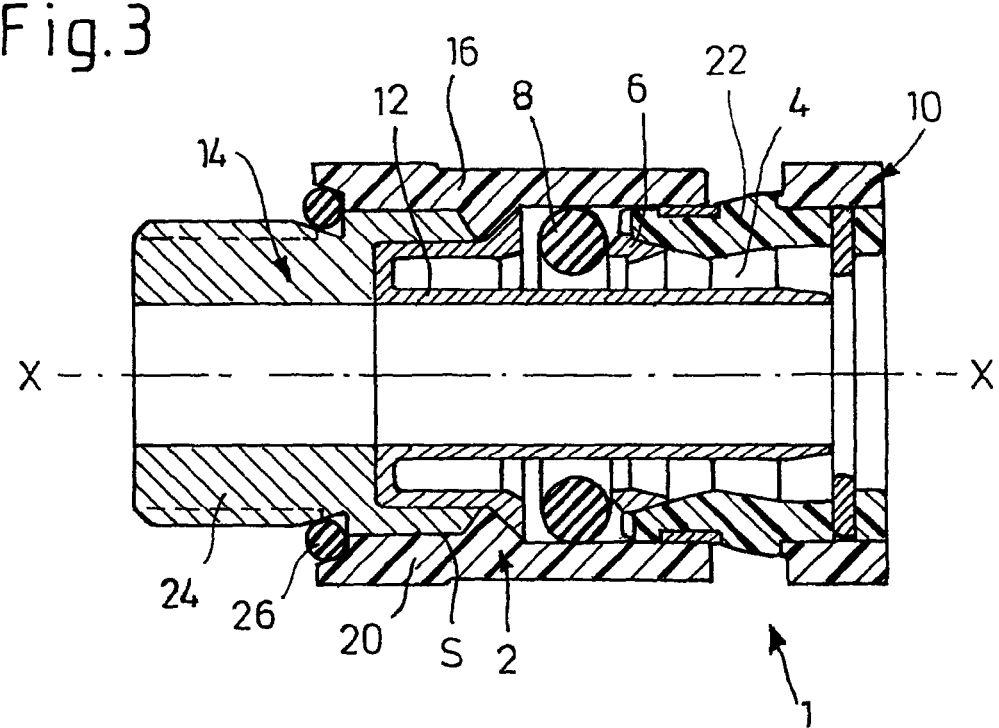
FIG. 3 shows a longitudinal section through a second embodiment of a plug connector according to the invention.
Figure 4:
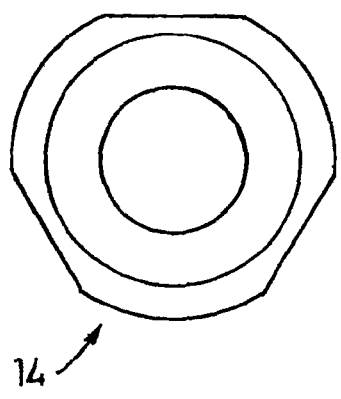
FIG. 4 shows an end view of a coupling part of the plug connector according to the invention shown in FIG. 3.
Figure 5:
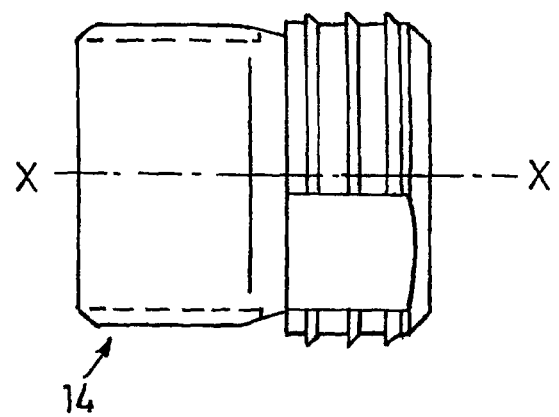
FIG. 5 shows a side view of a coupling part of the plug connector according to the invention shown in FIG. 3.

FIGS. 3 to 5 show an embodiment of the invention wherein the coupling part, 14 of base part 10 as a brass screw-in part having a screw in stub, 24 without hexagonal profile is inserted securely against relative rotation into the cuff part 16. It is retained here, for example, by ribs, as in the case of a so-called press-in cartridge. The ribs can be produced, for example, by turning an original polygonal profile, for example a triangular profile or a hexagonal profile as shown in FIGS. 4 and 5. The coupling part 14 is again hammered or pressed into the receiving part 16 from the direction of the screwing-in side and is provided at its hammering-in side (side opposite of the screw-in stub, 24, side) with retaining ribs which produce a frictional form fit in the receiving part. The substantially cylindrical hammering-in side has at least one surface which can transmit a torque for screwing in.

Figure 6:
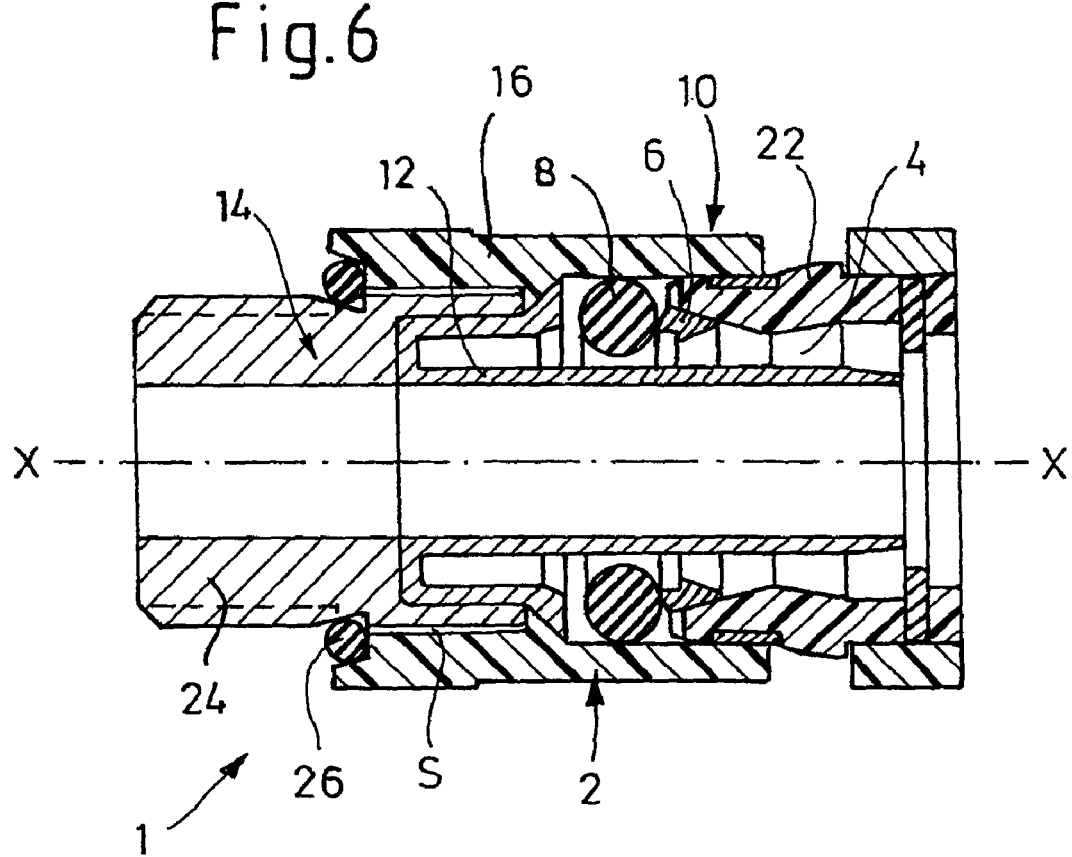
FIG. 6 shows a longitudinal section through a third embodiment of a plug connector according to the invention.

As shown in FIG. 6, the cuff part 16 can also be screwed together with the coupling part 14, which again may be designed as a brass screw-in part without hexagonal profile. The screw-in part here is screwed into the receiving part from the direction of the screwing-in side. For the connection between the cuff part and coupling part, use can preferably be made of a special thread which produces an increased force fit, as is described in DE 44 23 805 B4.

With regard to the above-illustrated technical embodiments of the invention, it should be noted that no separate sealing is necessary between the cuff part 16 (receiving part) and the coupling part 14 (screw-in part), since the interface (radial peripheral gap) between the two parts is sealed by the thread sealing which is present, that is to say the additional thread seal 26 arranged on the outer connecting section of 24 of the coupling part 14. An important feature in this connection is that the diameter of the coupling-side plug-in side, or rather screw-in side, is chosen such that the thread seal 26 cannot be brought into an unfavorable position by the system pressure.

In addition to the manner illustrated in FIG. 4, it is also possible to secure against relative rotation by means of knurls which are pressed together.

Figure 7:
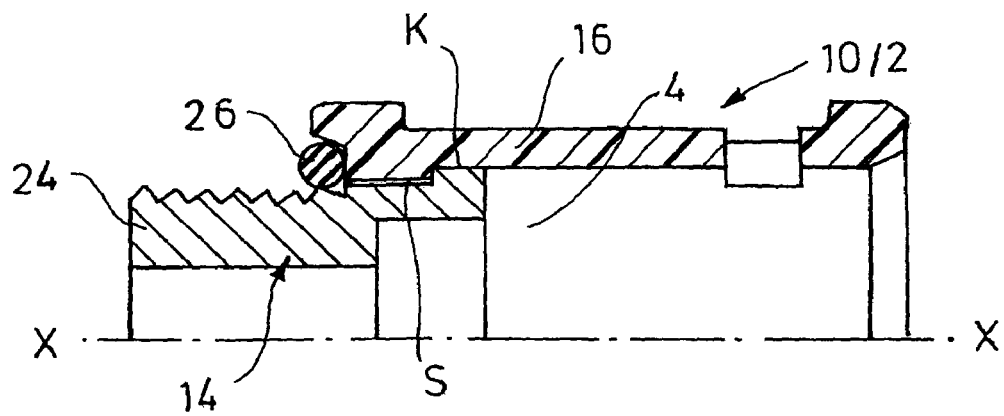
FIG. 7 shows a longitudinal section through a fourth embodiment of a plug connector according to the invention.
Figure 7:
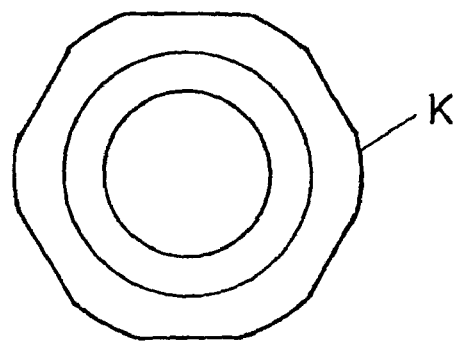
Figure 8:
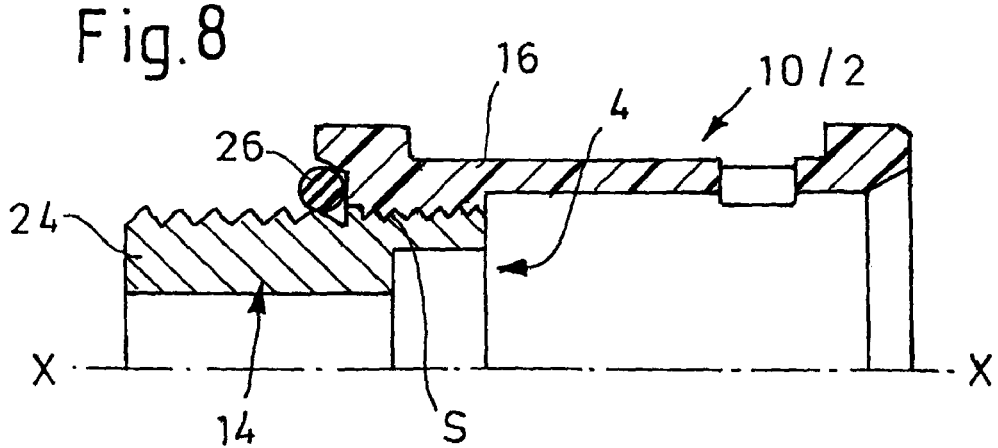
FIG. 8 shows a longitudinal section through a fifth embodiment of a plug connector according to the invention.

FIGS. 7 and 8 show further plug connectors 1 according to the invention. In the embodiment according to FIG. 7, the coupling part 14 made of metal, e.g., brass is pushed or pressed into the cuff part 16 made of plastic. The outer contour designated by the reference sign K is polygonal, preferably hexagonal—optionally with turned corners. While the connecting stub 24 is being mounted in a threaded hole, the tightening torque makes it possible to increase the pressing between the coupling part 14 and the cuff part 16. This is particularly advantageous when knurls are present.

In the embodiment according to FIG. 8, the coupling part 14 made of metal, e.g., brass is screwed together with the cuff part 16 made of plastic, with the thread G being a thread as disclosed for example in DE 44 23 805 B4. This embodiment is particularly distinguished by a short design of the metal part 14 and by small starting diameters.

Figure 9:
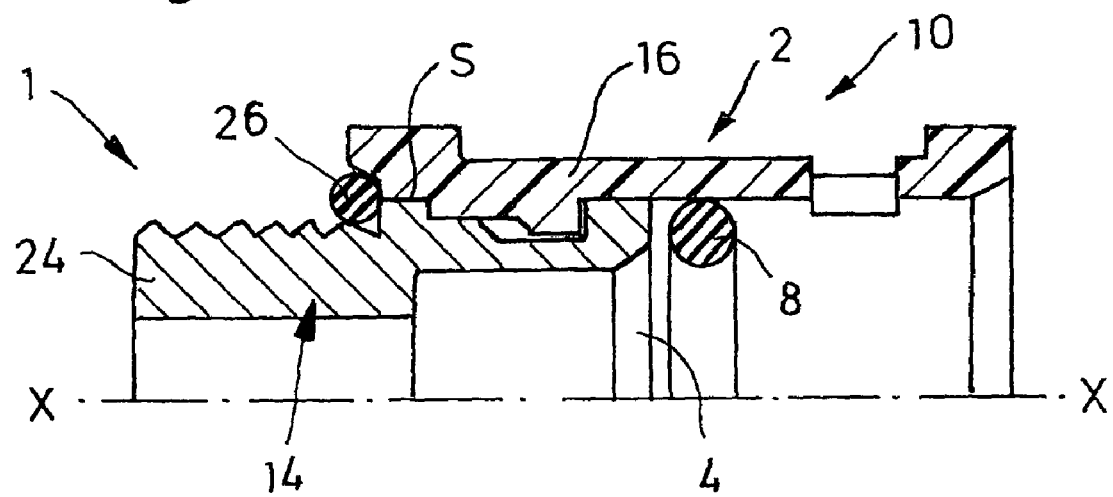
FIG. 9 shows a longitudinal section through a sixth embodiment of a plug connector according to the invention.
Figure 10:
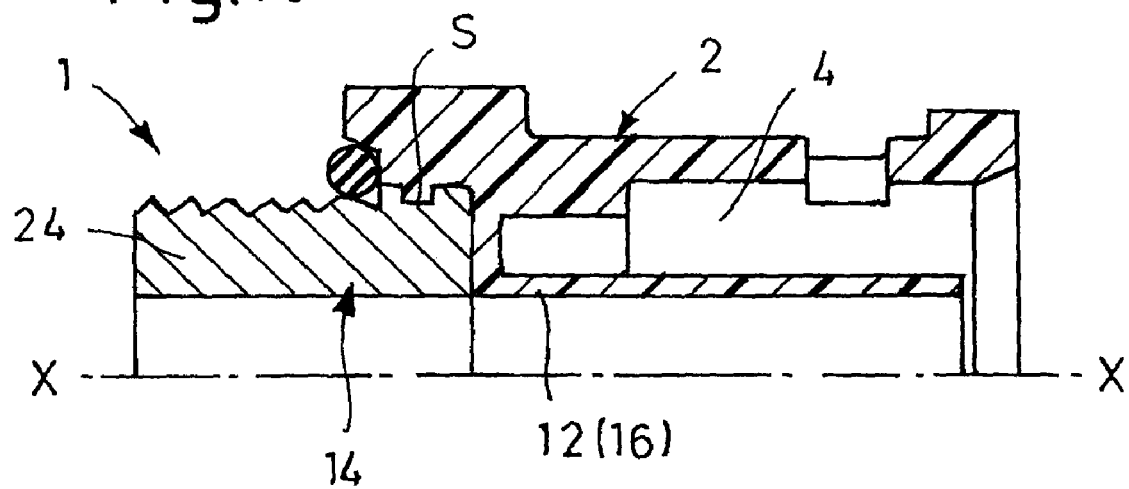
FIG. 10 shows a longitudinal section through a seventh embodiment of a plug connector according to the invention.

Further possible embodiments of the invention are shown in FIGS. 9 and 10, which differ in particular in terms of a different type of configuration of the division of the housing part 2 or the gap S between the cuff receiving part 16 and the coupling part 14. They simultaneously illustrate that the housing part 2, in particular its receiving part 16 and the coupling part 14, can be constructed in different ways according to the invention. Thus, for example, in the embodiment represented in FIG. 10, the receiving part 16 simultaneously performs the function of the supporting sleeve 12.

Figure 11:
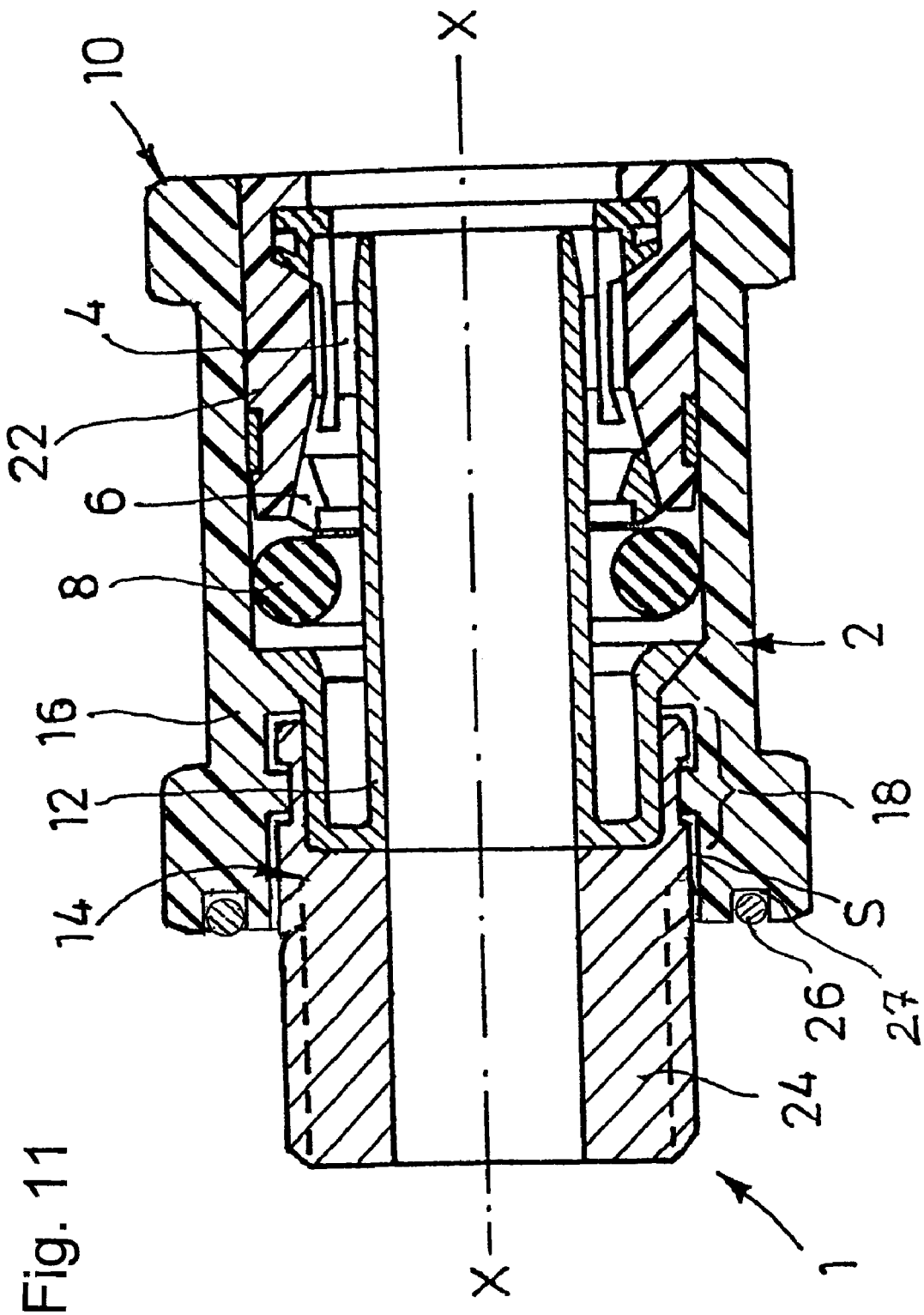
FIG. 11 shows a further longitudinal section—similar to that shown in FIG. 2—through an eighth embodiment of a plug connector according to the invention.

FIG. 11 shows a further embodiment of the invention, which differs from the above-represented embodiments particularly in terms of the arrangement of the additional thread seal 26. As for the other embodiments of the invention, the plug connector 1, as shown here is intended to be coupled to an assembly (not shown), in particular to be screwed into a screw-in opening there. The housing part 2 of the plug connector, in particular its receiving part 16 here, is in this case— as in the other embodiments—oriented with its end side, particularly in the form of a flange, parallel to the surface of the assembly, with the result that it can come to bear against this surface when in a state in which it is screwed in to the maximum. The additional seal 26 here is arranged in an annular groove 27 arranged on the end side and, when the plug connector 1 is in the mounted state, seals a gap S between the end face of the plug connector 1 and the assembly. In the mounted state, this gap is the continuation of the possible leakage path between the screw-in stub 24 of 14 and the receiving part 16. In order, according to the invention, to design the receiving part 16 such that it can be sealed with respect to the assembly, it is thus not necessary in each case for the additional seal 26 to be arranged directly in the gap, S region or at the end of gap S between the screw-in stub 24 and the receiving part 16, as is shown in the other embodiments.

According to FIGS. 1 to 6, the retaining element 6 interacts with an inner cone of an additional insert part 22, the mutual fastening being able to take place, for example, by way of a snap-action form-fitting connection. It also comes within the scope of the invention for such an insert part 22 not to be present. Its functions, such as supporting the retaining element 6, can be performed, at least in part, by a cuff part 16 designed in the manner of a union element. In principle, a retaining element with a force-fitting/form-fitting action, such as, for example, the retaining element 6 in FIG. 1, or else a form-fitting retaining element (cf. FIGS. 7 and 8) can be used. Here, both the "retention before sealing" and the "sealing before retention" principles are possible.

The invention is not confined to the exemplary embodiments illustrated, but also comprises all embodiments having an equivalent effect within the context of the invention, as is already clear from the different structural embodiments represented for the various components.

The invention claimed is:

1. A plug connector for plastic pipelines comprising a housing part with a plug socket for a fluid seal for the fluidtight insertion of a tubular plug-in part and for at least one retaining element for locking the plug-in part, wherein the housing part comprises, in two-part form, a receiving part and a coupling part, the receiving part enclosing the retaining element and the fluid seal, the coupling part is configured to couple the housing part to an assembly and configured to be sealed with respect to the assembly, whereby the housing part is divided in such a way that the receiving part is configured to be sealed directly with respect to the assembly, the coupling part and the receiving part are connected and fixedly engaged against relative rotation, whereby the coupling part and the receiving part axially interengage via coaxial connecting sections and are latched or pressed together in this region, the coupling part being made of metal and the receiving part being made of plastic, the coupling part including a screw-in stub and a seal, the seal enclosing the screw-in stub to seal the housing part to the assembly, the seal also being located so as to seal a gap between the coupling part and the receiving part thereby directly sealing the receiving part with respect to the assembly.

2. The plug connector as claimed in claim 1, wherein extends substantially peripherally around the coupling part from a first end of the gap situated in the plug socket to another end, wherein the seal is arranged at the another end of the gap.

3. The plug connector as claimed in claim 1, wherein the coupling part is made of brass.

* * * * *

UNITED STATES PATENT AND TRADEMARK OFFICE
CERTIFICATE OF CORRECTION

PATENT NO. : 8,056,939 B2  
APPLICATION NO. : 12/297842  
DATED : November 15, 2011  
INVENTOR(S) : Martin Lechner et al.

Page 1 of 1

It is certified that error appears in the above-identified patent and that said Letters Patent is hereby corrected as shown below:

In column 6, claim 2, line 38, after "in claim 1, wherein" insert --the gap--.

Signed and Sealed this
Thirteenth Day of March, 2012

David J. Kappos
*Director of the United States Patent and Trademark Office*